United States Patent
Sidi et al.

(10) Patent No.: US 9,749,711 B2
(45) Date of Patent: *Aug. 29, 2017

(54) SYSTEM AND METHOD FOR REAL-TIME LOCATION-BASED ADVERTISEMENT INSERTION INTO ONLINE CONTENT

(71) Applicant: Disney Enterprises, Inc., Burbank, CA (US)

(72) Inventors: Ariff Sidi, Studio City, CA (US); Skarphedinn Hedinsson, Stevenson Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/059,062

(22) Filed: Mar. 2, 2016

(65) Prior Publication Data

US 2016/0182970 A1     Jun. 23, 2016

Related U.S. Application Data

(63) Continuation of application No. 14/267,056, filed on May 1, 2014, now Pat. No. 9,311,658, which is a
(Continued)

(51) Int. Cl.
| | | |
|---|---|---|
| H04N 21/81 | (2011.01) | |
| G06F 15/16 | (2006.01) | |
| G06Q 30/02 | (2012.01) | |
| G11B 27/10 | (2006.01) | |
| H04N 21/45 | (2011.01) | |
| H04N 21/845 | (2011.01) | |

(52) U.S. Cl.
CPC ............ *H04N 21/812* (2013.01); *G06F 15/16* (2013.01); *G06Q 30/0261* (2013.01); *G11B 27/10* (2013.01); *H04N 21/4524* (2013.01); *H04N 21/8456* (2013.01)

(58) Field of Classification Search
CPC .......................... G06F 15/16; G06C 30/0261
USPC ....... 705/14.4, 14.72, 14.73, 14.49; 709/245, 709/244
See application file for complete search history.

(56) References Cited

U.S. PATENT DOCUMENTS

| | | | | |
|---|---|---|---|---|
| 6,718,551 B1 * | 4/2004 | Swix | ...................... | G06Q 30/02 348/E7.075 |
| 8,601,004 B1 * | 12/2013 | Mahadevan | ....... | G06Q 30/0261 705/14.53 |

(Continued)

*Primary Examiner* — Harunur Rashid
(74) *Attorney, Agent, or Firm* — Farjami & Farjami LLP

(57) ABSTRACT

There is provided a media content server for inserting a location-based advertisement into an online media content. The media content server comprises a memory including an online media content for online access; a processor configured to receive a request from a client for the online media content; determine an IP address of the client based on the request; map the IP address to a local advertisement server serving an area corresponding to the IP address; request a local advertisement from the local advertisement server; provide the local advertisement to the client; and provide the online media content from the memory to the client. The online media content has a first and second sequential segments, and the local advertisement may be provided to the client after the first segment is provided and before the second segment is provided.

10 Claims, 5 Drawing Sheets

Related U.S. Application Data continuation of application No. 12/221,959, filed on Aug. 8, 2008, now Pat. No. 8,769,149.

(56) References Cited

U.S. PATENT DOCUMENTS

| | | | |
|---|---|---|---|
| 2002/0100043 A1* | 7/2002 | Lowthert | H04N 5/4401 725/36 |
| 2003/0023489 A1* | 1/2003 | McGuire | G06Q 30/02 705/14.55 |
| 2003/0058707 A1* | 3/2003 | Dilger | G06Q 30/02 365/200 |
| 2003/0070167 A1* | 4/2003 | Holtz | G06F 17/30017 725/32 |
| 2004/0015608 A1* | 1/2004 | Ellis | G06Q 30/02 709/246 |
| 2005/0235318 A1* | 10/2005 | Grauch | G06Q 30/02 725/46 |
| 2006/0149624 A1* | 7/2006 | Baluja | G06Q 30/0255 705/14.53 |
| 2007/0022011 A1* | 1/2007 | Altberg | G06Q 30/02 705/14.55 |
| 2007/0100690 A1* | 5/2007 | Hopkins | G06Q 30/02 705/14.67 |
| 2010/0031136 A1* | 2/2010 | Chen | G06Q 30/0269 715/234 |

\* cited by examiner

SYSTEM AND METHOD FOR REAL-TIME LOCATION-BASED ADVERTISEMENT INSERTION INTO ONLINE CONTENT

This application is a Continuation of U.S. application Ser. No. 14/267,056, filed May 1, 2014, which is a Continuation of U.S. application Ser. No. 12/221,959, filed Aug. 8, 2008, now U.S. Pat. No. 8,769,149, which is hereby incorporated by reference in its entirety.

BACKGROUND OF THE INVENTION

1. Field of the Invention

The present invention relates generally to electronic circuits and systems. More particularly, the present invention relates to communications systems for transmission of digital data.

2. Background Art

Television broadcasters often serve two different advertising markets, a national market and a local or affiliate market. Since the broadcast of local television signals is handled by local affiliates that only broadcast to a specific local area, it is straightforward for affiliates to sell targeted advertisements to local businesses interested in advertising locally. This model provides mutual benefits in the form of increased revenue opportunities for affiliate television studios and increased visibility for local businesses.

Recently, the increasing availability of broadband Internet connections has enabled new methods of real-time media delivery such as Internet streaming video. The worldwide nature of the Internet provides numerous benefits by breaking down physical and geographic barriers, but at the same time poses challenges for content providers in providing relevant and local advertising. Although users may voluntarily provide information regarding their location, the additional hassle of providing this information may deter users from accessing the content at all, and the accuracy of such user-volunteered information may be questionable. Thus, many content providers customize the advertising content based on variables stored in a server providing the content, rather than information volunteered by the user.

For example, one method of customization is to provide separate distinct website domains, each domain providing local content for each locality. This method requires the user to manually select the correct local domain. The user might know the name of the local broadcaster and search for the website by that name. Alternatively, the national broadcaster might have an entry page allowing users to select a local broadcaster website on an image map. In either case, the user is required to take additional inconvenient and error-prone steps to find the proper local broadcaster online.

Another common method of customization is to build a profile of the websites that a user commonly visits, then tailoring the content of advertisements to be relevant to the visited websites. This method is often implemented using a third party cookie technique, whereby a third party server tracks the website visiting habits of a user through a cookie. However, applying this technique to provide local advertising requires numerous preconditions to be met. First, the user must visit a significant number of websites with local content corresponding to the user location. Second, those websites must utilize the same third party advertising company. Third, the third party advertising company must offer geographically targeted services to regional advertisers, and retain advertisers operating in the same location as the user. Meeting all these preconditions concurrently may prove to be difficult.

Accordingly, there is a need to overcome the drawbacks and deficiencies in the art by providing a way to present locally customized advertising content in real-time Internet applications without requiring undue effort and inconvenience from users. Users thus benefit from advertising more likely to be of interest, local advertisers benefit from affordable exposure to targeted markets, and content providers benefit from additional revenue streams.

SUMMARY OF THE INVENTION

There are provided systems and methods for real-time location-based advertisement insertion into online content, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to systems and methods for real-time location-based advertisement insertion into online content. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
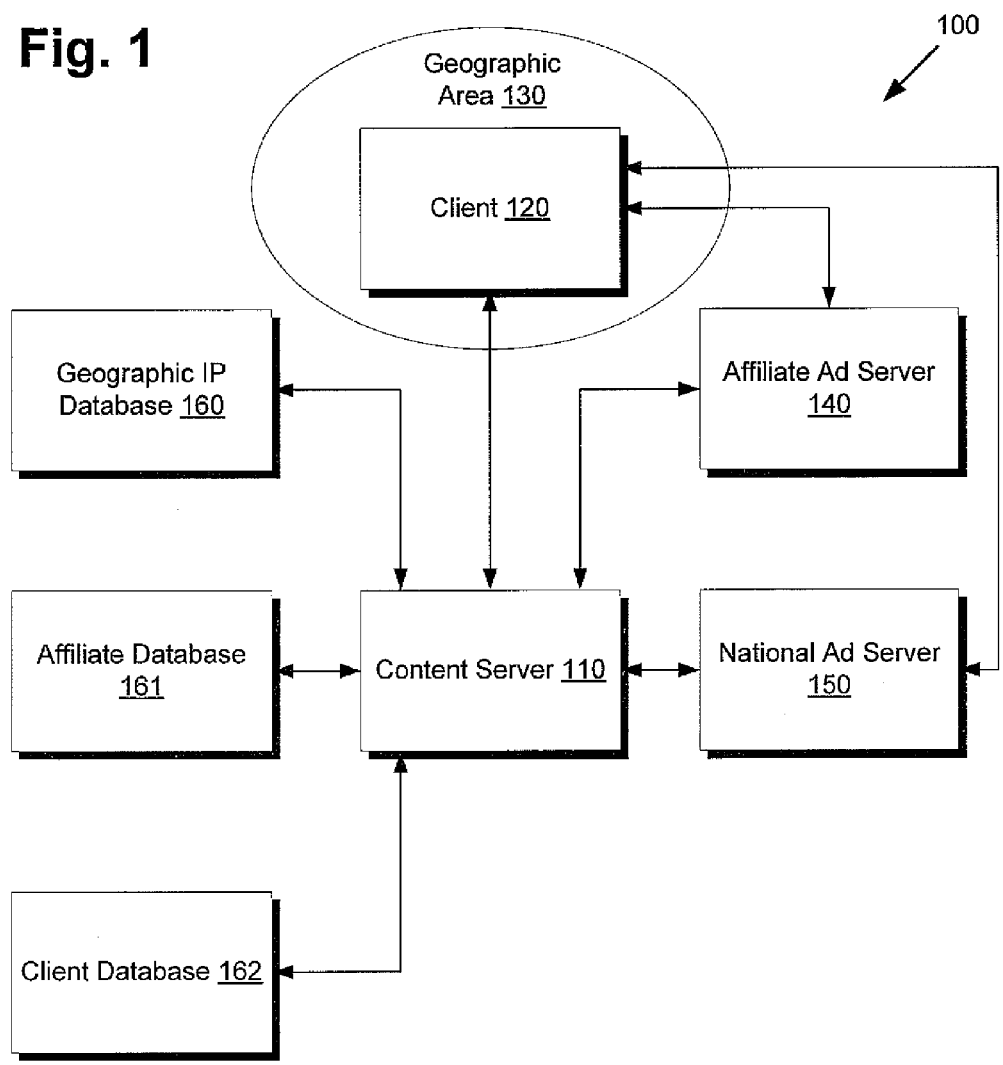
FIG. 1 presents a real-time location-based advertisement insertion system, according to one embodiment of the present invention.

FIG. 1 presents a real-time location-based advertisement insertion system, in accordance with one embodiment of the present invention. Real-time location-based advertisement insertion system 100 includes content server 110, client 120 within geographic area 130, affiliate ad server 140, national ad server 150, geographic IP database 160, affiliate database 161, and client database 162.

For the present example, content server 110 might comprise a web server including a processor and a memory. The processor handles all the logic requirements of the server, including data communications with other Internet connected devices. The memory might contain prerecorded video media files of popular television shows formatted for Internet streaming. Alternative embodiments might include streaming radio, an online game with in-game video advertisements, a live video camera feed, and other forms of streaming or interactive entertainment. Although only one content server is shown, alternative embodiments might use multiple content servers to handle the bandwidth requirements of supporting multiple concurrent users. Client 120 might then represent a personal computer running a web browser or any other computing device. A user might use client 120 to access content server 110, desiring to catch the latest streaming video episode of "Misplaced." Geographic area 130 encompasses client 120 in FIG. 1, where geographic area 130 might correspond to a ZIP code, a city, a set of coordinates, or some other geographical classification, such as longitude and latitude.

Affiliate ad server 140, which might also be referred to as a local ad server, serves advertisements to a specific area, which corresponds to geographic area 130 in FIG. 1. Alternative embodiments might include multiple discrete geographic areas in the specific area. Also, the physical location of affiliate ad server 140 might be far removed from the specific area served, since affiliate ad server 140 can be accessible from any Internet connection. This might be the case if servers are consolidated in one location or remote datacenters are used. National ad server 150, in this embodiment, provides advertisements for the entire nation without regard to location. In an alternative embodiment, national ad server 150 might simply have a broader geographic coverage area than affiliate ad server 140, such as a large metropolitan city area versus a single zip code area, respectively.

Each of these ad servers also contains a processor and a memory much like content server 110, with the memory containing advertisement materials from sponsors. Since the present embodiment involves streaming video, these advertisement materials might comprise prerecorded video segments intended to play during program content. These advertising materials might be presented using the traditional method of breaking program content into a first and second sequential segments, with advertisements inserted in-between the segments. Alternatively, the advertising materials might be overlaid on top of the actual programming. This overlay might be implemented using a transparent video window or a video banner area adjacent to the programming. Analogously, an ad server providing advertising materials for an Internet radio station might include advertising clips to be inserted between songs or mixed directly into an audio mix.

Geographic IP database 160 links IP addresses to geographic areas; affiliate database 161 links geographic areas to affiliate ad servers; client database 162 links clients to profiles containing information about the associated user, including a user submitted location. These relationships help content server 110 establish the correct affiliate ad server 140 to serve client 120 based on the detected geographic area 130. The process of establishing this chain of relationships shall be discussed in conjunction with FIG. 4 below.

Figure 2:
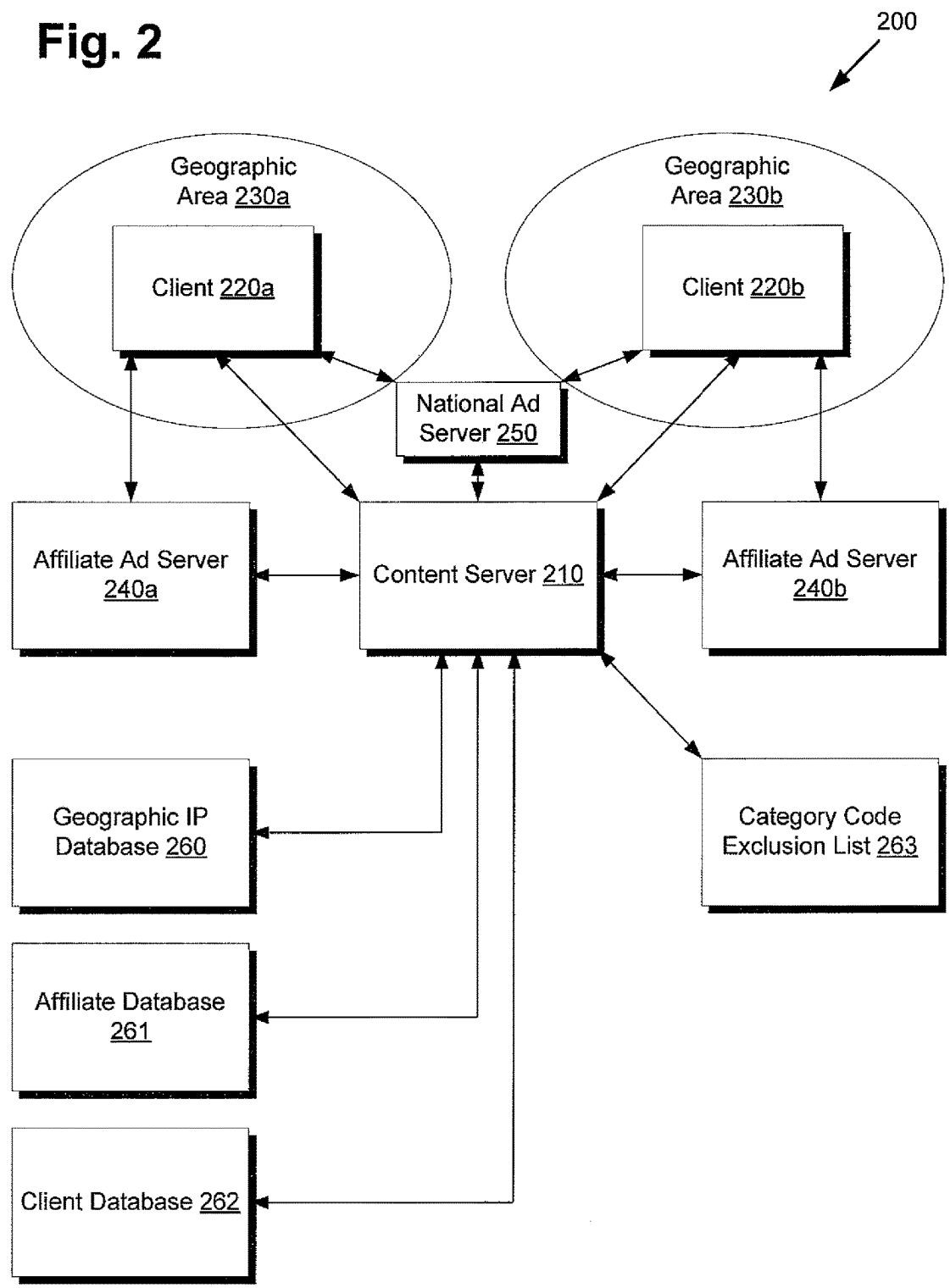
FIG. 2 presents a real-time location-based advertisement insertion system, according to another embodiment of the present invention.

Moving to FIG. 2, FIG. 2 presents a real-time location-based advertisement insertion system, in accordance with another embodiment of the present invention. FIG. 2 is similar in layout to FIG. 1, but includes multiple geographic areas, multiple clients, multiple affiliate ad servers, and a category code exclusion list. More specifically, real-time location-based advertisement insertion system 200 includes content server 210, client 220a within geographic area 230a, client 220b within geographic area 230b, affiliate ad servers 240a and 240b, national ad server 250, geographic IP database 260, affiliate database 261, client database 262, and category code exclusion list 263.

Many of the elements in FIG. 2 correspond to elements in FIG. 1. Content server 210 corresponds to content server 110. Clients 220a and 220b correspond to client 120. Geographic areas 230a and 230b correspond to geographic area 130, although they each represent distinct areas. Affiliate ad servers 240a and 240b correspond to affiliate ad server 140. National ad server 250 corresponds to national ad server 150. Geographic IP database 260 corresponds to geographic IP database 160. Affiliate database 261 corresponds to affiliate database 161. Client database 262 corresponds to client database 162. One new element introduced into FIG. 2 is category code exclusion list 263, which shall be discussed in more detail with FIG. 3 below.

FIG. 2 presents an extended embodiment of the real-time location-based advertisement insertion system from FIG. 1, the system now serving multiple clients in different geographic areas. Although geographic areas 230a and 230b could conceivably fall within the purview of a single affiliate ad server due to, for example, close proximity, it might be assumed that geographic areas 230a and 230b are distant enough to warrant independent affiliate ad servers as represented by affiliate ad servers 240a and 240b. For example, geographic area 230a might represent Los Angeles, Calif., while geographic area 230b might represent Detroit, Mich. Advertising clients for affiliate ad server 240a might include a local surfboard manufacturer, whereas clients for affiliate ad server 230b might include a local snow shovel manufacturer.

The system of FIG. 2 works similarly to FIG. 1, but content server 210 will be able to distinguish between clients 220a and 220b and their associated geographic areas and affiliate ad servers. Additionally, the presence of category code exclusion list 263 allows the system of FIG. 2 to prevent advertisements from different servers from conflicting with each other, which shall be discussed in conjunction with FIGS. 3 and 5 below.

Figure 3:
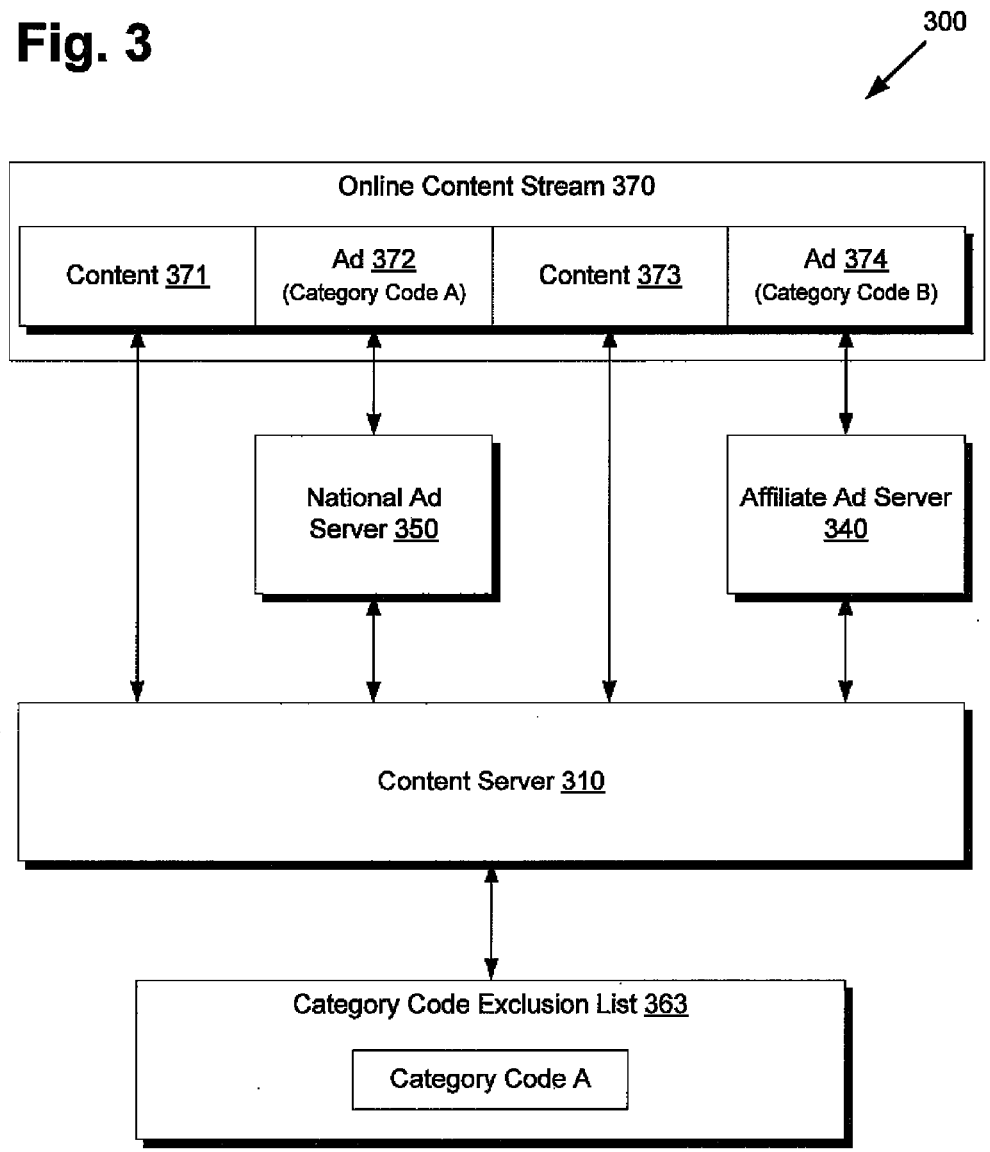
FIG. 3 presents a block diagram of an online content stream with advertisement insertion by a content server avoiding the same category code from a first and second advertisement server, in accordance with one embodiment of the present invention.

Moving to FIG. 3, FIG. 3 presents a block diagram of an online content stream with advertisement insertion by a content server avoiding the same category code from a first and second ad server, in accordance with one embodiment of the present invention. Online content stream environment 300 includes content server 310, affiliate ad server 340, national ad server 350, category code exclusion list 363, and online content stream 370. Category exclusion list 365 includes category code A. Online content stream 370 includes content 371, ad 372, content 373, and ad 374. Ad 372 belongs to category code A, and ad 374 belongs to category code B.

FIG. 3 also includes several corresponding components from FIG. 2. Affiliate ad server 340 corresponds to affiliate ad server 240a or 240b. National ad server 350 corresponds to national ad server 250. Category code exclusion list 363 corresponds to category code exclusion list 263. Content server 310 corresponds to content server 210.

Online content stream 370 of FIG. 3 is assembled in real-time by content server 310. Continuing with the "Misplaced" example above, content 371 and 373 might represent the first and second half segments of a Misplaced episode. National ad server 350 provides ad 372 belonging to category code A. Affiliate ad server 340 provides ad 374 belonging to category code B. As noted, content server 310 will be able to prevent ads 372 and 374 from using the same category code, and that process shall be discussed in conjunction with FIG. 5 below. Although online content stream 370 is depicted as a sequential series of discrete segments, ads 372 and 374 might also be overlaid on top of content 371 and 373, as previously noted. This might be desirable to prevent the skipping of advertisements by embedding the advertising within the actual content, increasing the chances that the viewer will actually watch or read the advertisements. Additionally, although ads 372 and 374 imply only a singular advertisement in FIG. 3, alternative embodiments might include multiple advertisements from different sponsors. The sequence of steps to assemble online content stream 370 will be discussed in conjunction with FIG. 5 below.

Figure 4:
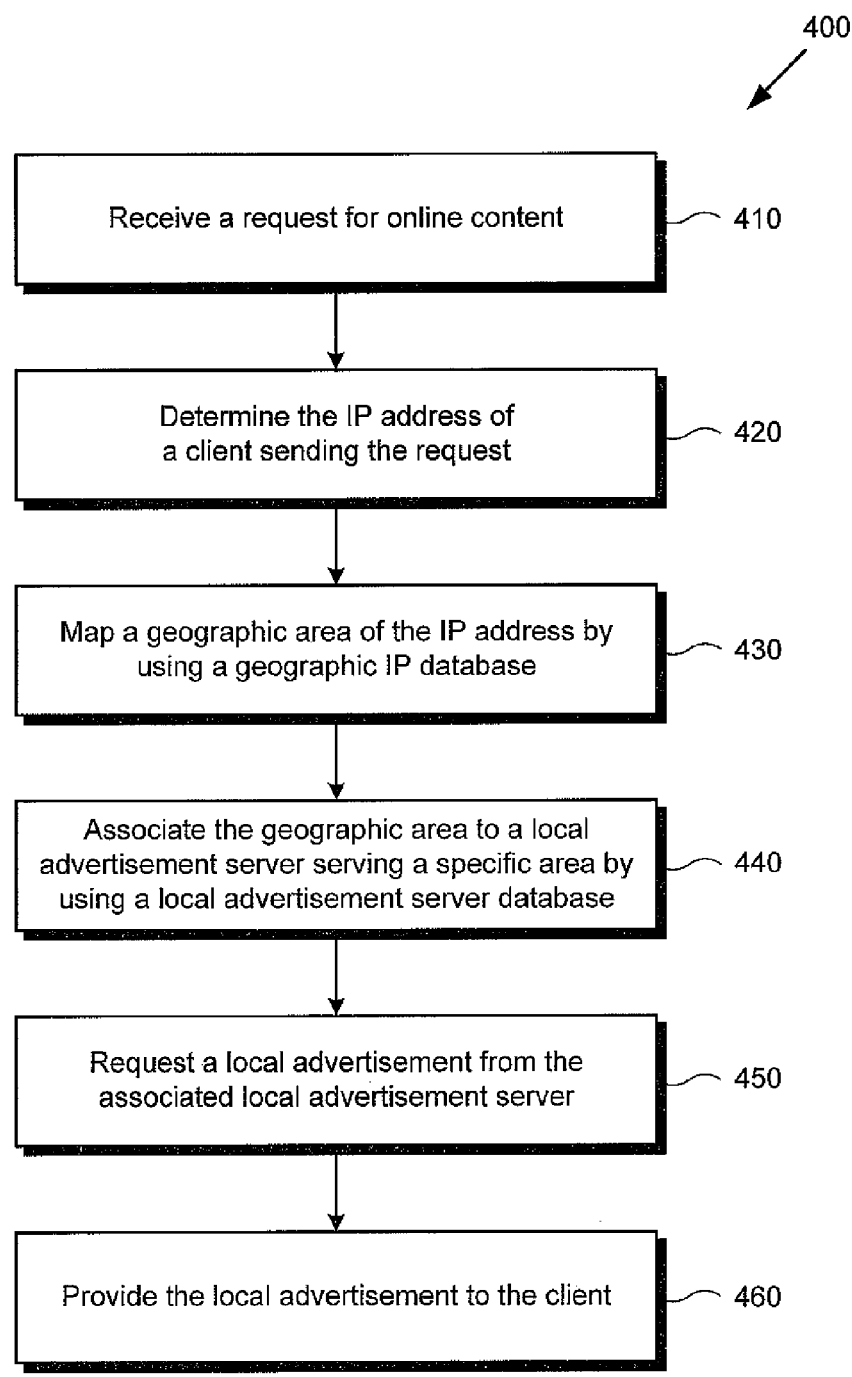
FIG. 4 shows a flowchart describing the steps, according to one embodiment of the present invention, by which a content server can provide real-time location-based advertisement insertion into online content.

FIG. 4 shows a flowchart describing the steps, according to one embodiment of the present invention, by which a content server can provide real-time location-based advertisement insertion into online content. Certain details and features have been left out of flowchart 400 that are apparent to a person of ordinary skill in the art. For example, a step may comprise one or more substeps or may involve specialized equipment or materials, as known in the art. While steps 410 through 450 indicated in flowchart 400 are sufficient to describe one embodiment of the present invention, other embodiments of the invention may utilize steps different from those shown in flowchart 400.

Referring to step 410 of flowchart 400 in FIG. 4 and real-time location-based advertisement insertion system 100 of FIG. 1, step 410 of flowchart 400 comprises content server 110 receiving a request for online content. As previously discussed, a processor embedded in content server 110 will likely process this request and all other logic and network operations. One embodiment might comprise an exchange of data over the Internet using the Hypertext Transfer Protocol (HTTP), where client 120 is executing a web browser and content server 110 is executing a web server application on the processor. In the present example, client 120 requests a streaming video episode of the television series Misplaced from content server 110.

At step 420, content server 110 determines the Internet Protocol (IP) address of client 120 sending the request for Misplaced. The web server application executing on content server 110 can be configured to determine this IP address, as incoming Internet data packets from clients will include information concerning the originating IP address. Although this IP address may not always correspond to the user's true IP address due to proxy servers, router network address translation, IP spoofing, and other potential network routing issues, for a majority of users the source IP address will remain relatively static. The potential widespread adoption of the next generation IPv6 versus the current IPv4 may also inspire more confidence in the reliability of the source IP address.

At step 430, content server 110 maps geographic area 130 to the IP address obtained from step 420 by using geographic IP database 160. Geographic IP database 160 might be provided by a third party source that specializes in IP address intelligence, analyzing the entire valid IP address space and attempting to accurately map each IP address to a particular geographic area or some other data criteria. Content server 110 will then be able to look up the IP address associated with client 120 and identify that client 120 is operating from geographic area 130, since geographic IP database 160 has previously identified that the IP address or range of IP addresses corresponds to geographic area 130.

Alternatively, the information provided by geographic IP database 160 may fit into a hierarchy of geographic location data, used in conjunction with a user registration system. Users accessing content server 110 may be required to register first, volunteering demographic details such as location. These details might be stored in client database 162, accessible to content server 110 once a user is logged in. Then, when content server 110 accesses geographic IP database 160, it may also access client database 162 and make a decision as to which location to use. If, for example, the location associated with the user profile has a high confidence of accuracy, being previously used in an e-commerce transaction or matching with the IP database location at the time of registration, content server 110 may give greater deference to the user profile, attributing an incongruent IP location with a traveling user or network routing issues. On the other hand, if content server 110 suspects that the volunteered geographic information is inaccurate, for example referencing a blatantly fictional name or city, it may prefer to ignore the associated user profile and rely on the IP database lookup instead. However, if content server 110 does not require registration, it may need to fall back to IP database lookup as the sole provider of location information for unregistered users.

At step 440, content server 110 associates geographic area 130 retrieved from step 430 to affiliate ad server 140 serving a specific area by using affiliate database 161. The owners of content server 110 may also likely administer affiliate database 161, since the data pertaining to the broadcast coverage and target markets for each affiliate or local broadcaster will likely be most readily accessible from the content provider itself, which might represent, for example, a major national television network. Once affiliate database 161 is properly setup, it will map a particular geographic area to an affiliate responsible for that geographic area, and vice versa. Thus, content server 110 may request affiliate database 161 to provide the affiliate ad server that is responsible for serving geographic area 130, and affiliate database 261 will reply by associating affiliate ad server 140.

Although in this particular example, affiliates appear to be responsible to geographic areas in a one-to-one relationship, alternative embodiments may have an affiliate responsible for multiple geographic areas. As previously mentioned, this might be due to the geographic proximity of certain geographic areas. For example, one affiliate ad server might serve two nearby cities. Similarly, multiple affiliates may be responsible for the same overlapping geographic area. This might be the case, for example, near state borders. Residents in Michigan might receive Ohio based advertisements, and vice versa. In this situation, content server 110 might be programmed with a policy to prefer a particular affiliate, balance coverage among the multiple affiliates, or some other rationale, depending on business priorities. Additionally, although the local advertisement servers are referred to as "affiliates," they do not necessarily need to be affiliated with a larger owning entity. The word "affiliate" as used here is to emphasize the local service area of the servers.

At step 450, content server 110 contacts affiliate ad server 140 associated from step 440 with a request for a local advertisement. This request might also include category exclusions, which will be detailed with FIG. 5 below.

Depending on the desired network arrangement and method of advertisement insertion, the local advertisement request may further instruct that the local advertisement route back to content server 110 first before being provided to the client. As shown in FIG. 1, two paths are available to client 120 from affiliate ad server 140: one is a direct path, and the other uses content server 110 as an intermediary. In the direct path, affiliate ad server 140 will directly stream the local advertisement to client 120. This reduces the workload and bandwidth requirements for content server 110, since it only needs to pass an instruction to affiliate ad server 140 to provide the local advertisement to client 120 directly. For example, a media playlist served to client 120 by content server 110 might be appended with a proper local advertisement reference pointing directly to a video advertisement provided by affiliate ad server 140. However, this method can be somewhat less flexible, as content server 110 cannot manipulate the advertisement data since it reaches client 120 directly. Alternatively, content server 120 might retrieve the local advertisement from affiliate ad server 140, and then serve the local advertisement to client 120. Although this intermediary method might consume more computing and networking resources than the direct reference method, content server 120 can now manipulate the advertisement data. For example, content server 120 might overlay the advertisement data over the requested content, making it more difficult to isolate and remove the advertisement data and more likely that the user will view the advertisement.

At step 460, the local advertisement is provided to client 120. Whether the advertising content is served directly or through content server 110, it will be requested and provided on demand to client 120, in real-time. An advertiser will want some assurance that paid advertising impressions are actually accessed from start to finish. Although using completed advertisement playback as a metric does not catch circumstances where the advertisement is not viewed even though it is played, such as when the user steps out for a break or is otherwise not viewing the media player, it is at least a quantifiable action that can be recorded. Additionally, since the advertisements are served during or in-between sequential segments of the requested media content rather than only at the beginning or end, there is a greater chance that the user will actually pay attention to the advertisements. Thus, affiliate ad server 140 will provide advertisements in real-time and will record advertisement impressions in real-time after an advertisement is finished.

Content server 110 can also serve advertisements from ad servers other than affiliate ad server 140. National ad server 150, for example, may provide advertisements for advertisers that wish to promote their service or product nationwide. There may also exist different geographical hierarchies of ad servers. For example, ad servers might exist at the local affiliate level, then at the state level, then at the US region level such as the West coast or the Midwest. A larger number of geographical ad server layers might provide greater marketing flexibility for advertisers at the cost of increased maintenance and administrative overhead for the content provider.

Content server 110 might distribute the frequency of ad server selection based on the relative importance of the served target market. For example, advertisers conducting expensive national advertising campaigns might expect advertisements from national ad server 150 to be selected more often than affiliate ad server 140, and content server 110 might arrange its server selection algorithm accordingly. Additionally, content server 110 might favor national ad server 150 over affiliate ad server 140 in the event of a conflict, which shall be discussed below in conjunction with FIG. 5.

Figure 5:
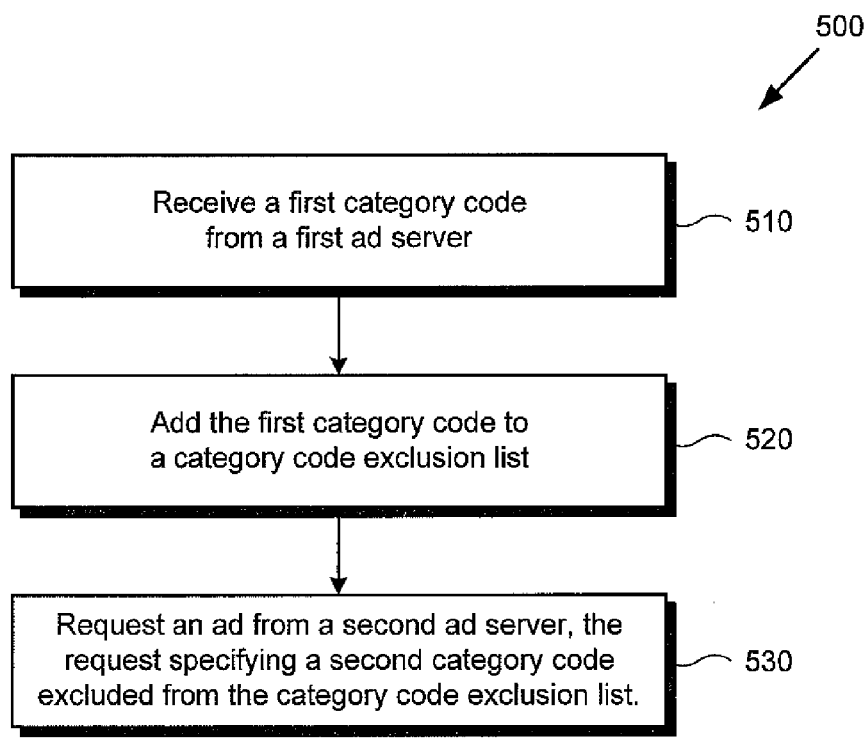
FIG. 5 shows a flowchart describing the steps, according to one embodiment of the present invention, by which a content server can prevent the insertion of advertisements belonging to a same category from a first advertisement server and a second advertisement server.

FIG. 5 shows a flowchart describing the steps, according to one embodiment of the present invention, by which a content server can prevent the insertion of advertisements belonging to a same category from a first ad server and a second ad server. This functionality may be desirable to avoid a conflict of interest, such as the selection of advertisements from competitors in the same industry. Certain details and features have been left out of flowchart 500 that are apparent to a person of ordinary skill in the art. For example, a step may comprise one or more substeps or may involve specialized equipment or materials, as known in the art. While steps 510 through 540 indicated in flowchart 500 are sufficient to describe one embodiment of the present invention, other embodiments of the invention may utilize steps different from those shown in flowchart 500.

Referring to step 510 of flowchart 500 in FIG. 5 and online content stream environment 300 of FIG. 3, step 510 of flowchart 500 comprises content server 310 receiving category code A from national ad server 350. The decision to use category code A might be made by content server 310 or national ad server 350, depending on the desired placement of category selection authority. As can be seen by online content stream 370, at step 510, content 371 has already been served to the user, and ad 372 is in the process of being served to the user. However, the retrieval of a category code does not necessarily need to coincide with the serving of the associated advertisement. For example, if the first advertisement, ad 372, were to originate from affiliate ad server 340 instead, content server 310 might still access national ad server 350 first to obtain a category code for exclusion. Content server 310 might also retrieve multiple category codes, for example due to multiple advertisements with different category codes.

At step 520, content server 310 adds category code A to category code exclusion list 363. This is shown completed by the presence of category code A within category code exclusion list 363. The category code exclusion list represents a list of categories that ad servers with a lower priority should avoid selecting advertisements from. Since national advertisers might be given preferential treatment over local advertisers, national ad server 350 might be configured to have priority over affiliate ad server 340 in the selection of potentially conflicting advertisements at content server 310. Although FIG. 3 depicts only a single category code exclusion list, there might be multiple exclusion lists if an advanced conflict management system is needed.

At step 530, content server 310 requests an advertisement from affiliate ad server 340, the request specifying a category code excluded from category code exclusion list 363. Much like step 510, either content server 310 might specifically request a certain category code, or affiliate ad server 340 might choose a category code after being given a copy of category code exclusion list 363, depending on the desired allocation of category selection authority. In the present embodiment, content server 310 provides affiliate ad server 340 a copy of category code exclusion list 363 containing category code A. Affiliate ad server 340 examines the copy of exclusion list 363 and discovers category code A, so affiliate ad server 340 thus selects a different category code B. An associated ad 374 under category code B is also served to the user after content 373 in online content stream 370. Again, the provision of ad 374 does not necessarily have to coincide with step 530, although it does in this particular case.

At the end of step 530, a potential conflict of interest may be diverted, as the advertisements selected from affiliate ad server 340 will not match the category code of advertisements selected from national ad server 350. For example, if category code A was beer, and national ad server 350 retains a multinational beer company as an advertiser while affiliate ad server 340 retains a local microbrewery as another advertiser, following the steps of flowchart 500 would avoid the awkward situation of airing advertisements from both beer companies. The situation might be especially damaging if the advertisement from the microbrewery compares the beer from the multinational beer company unfavorably, citing its lack of flavor and body compared to the lovingly crafted local microbrew. Thus, category code B might comprise deodorant, which is unrelated to beer and thus has little chance of conflicting with advertisements selected from category code A.

The period of time that category codes will remain in category code exclusion list 363 might also be managed in a way that minimizes conflicts while providing enough opportunity for advertisers to air their messages. For example, certain blocks of time or date ranges might be reserved for the national advertiser, leaving other time periods open for affiliate advertisers. Alternatively, the scope of conflict resolution may be limited to merely the full playback of a single online content request, so that conflicts do not appear during a single episode or session.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A media content server for inserting a location-based advertisement into an online media content to be provided to a client located at first geographic coordinates, the media content server comprising:
   a memory including a plurality of online media contents for online access, including a first online media content having a first sequential segment and a second sequential segment;
   a hardware processor configured to:
      receive a request from the client for the first online media content;
      obtain the first geographic coordinates of the client;
      determine a location of the client based on the first geographic coordinates;
      obtain a geographic area of the client based on the location;
      associate the geographic area to a local advertisement server serving the geographic area by using a local advertisement server database mapping a plurality of geographic areas to corresponding local advertisement servers serving each of a plurality of geographic areas;
      receive an excluded ad category from a national ad server;
      request a local advertisement from the associated local advertisement server, wherein the request for the local advertisement includes the excluded ad category directing the associated local advertisement server not to select the local advertisement from the excluded ad category, wherein the excluded ad category prevents the associated local advertisement server from selecting an industry competitor ad in a same category as the excluded ad category;
      provide the first sequential segment to the client;
      provide the local advertisement to the client after providing the first sequential segment; and
      provide the second sequential segment to the client after providing the local advertisement.

2. The media content server of claim 1, wherein the first geographic coordinates include longitude and latitude.

3. The media content server of claim 1, wherein the local advertisement is provided concurrently with the first online media content.

4. The media content server of claim 1, wherein the first online media content is streaming video.

5. The media content server of claim 1, wherein the first online media content is streaming audio.

6. A method for use by a media content server for inserting a location-based advertisement into an online media content to be provided to a client located at first geographic coordinates, the media content server including a hardware processor and a memory having a plurality of online media contents for online access including a first online media content having a first sequential segment and a second sequential segment, the method comprising:
   receiving, using the hardware processor, a request from the client for the first online media content;
   obtaining, using the hardware processor, the first geographic coordinates of the client;
   determining, using the hardware processor, a location of the client based on the first geographic coordinates;
   obtaining, using the hardware processor, a geographic area of the client based on the location;
   associating, using the hardware processor, the geographic area to a local advertisement server serving the geographic area by using a local advertisement server database mapping a plurality of geographic areas to corresponding local advertisement servers serving each of a plurality of geographic areas;
   receiving, using the hardware processor, an excluded ad category from a national ad server;
   requesting, using the hardware processor, a local advertisement from the associated local advertisement server, wherein the request for the local advertisement includes the excluded ad category directing the associated local advertisement server not to select the local advertisement from the excluded ad category, wherein the excluded ad category prevents the associated local advertisement server from selecting an industry competitor ad in a same category as the excluded ad category;
   providing, using the hardware processor, the first sequential segment to the client;
   providing, using the hardware processor, the local advertisement to the client after providing the first sequential segment; and
   providing, using the hardware processor, the second sequential segment to the client after providing the local advertisement.

7. The method of claim 6, wherein the first geographic coordinates include longitude and latitude.

8. The method of claim 6, wherein the local advertisement is provided concurrently with the first online media content.

9. The method of claim 6, wherein the first online media content is streaming video.

10. The method of claim 6, wherein the first online media content is streaming audio.

* * * * *